(12) United States Patent
Lasky et al.

(10) Patent No.: US 7,665,168 B2
(45) Date of Patent: *Feb. 23, 2010

(54) CAP FOR SECURING INTERCONNECTED LINEAR MEMBERS OF A FRAME STRUCTURE

(75) Inventors: Sidney Lasky, Novelty, OH (US); Mark J Quintile, Brunswick, OH (US); Neil J. Dwyer, Parma, OH (US); Edward Weintraub, Moreland Hills, OH (US)

(73) Assignee: Mantua Manufacturing Co., Walton Hills, OH (US)

( * ) Notice: Subject to any disclaimer, the term of this patent is extended or adjusted under 35 U.S.C. 154(b) by 99 days.

This patent is subject to a terminal disclaimer.

(21) Appl. No.: 11/859,947

(22) Filed: Sep. 24, 2007

(65) Prior Publication Data

US 2008/0078025 A1 Apr. 3, 2008

Related U.S. Application Data

(63) Continuation-in-part of application No. 11/534,785, filed on Sep. 25, 2006, now Pat. No. 7,526,825.

(51) Int. Cl.
*A47C 19/02* (2006.01)

(52) U.S. Cl. ............ 5/663; 5/285; 5/286; 5/200.1
(58) Field of Classification Search ............ 5/200.1, 5/201, 907, 282.1, 285, 286, 310, 663, 203, 5/204, 207; 248/345.1
See application file for complete search history.

(56) References Cited

U.S. PATENT DOCUMENTS

| | | | |
|---|---|---|---|
| 3,683,429 A | 8/1972 | Mis | |
| 6,397,412 B1 | 6/2002 | Quintile | |
| 6,826,790 B1 * | 12/2004 | Polevoy et al. | 5/200.1 |
| 6,941,596 B2 | 9/2005 | Schuman et al. | |
| 7,047,579 B2 | 5/2006 | Piana | |
| 7,526,825 B2 * | 5/2009 | Lasky et al. | 5/663 |
| 2005/0278858 A1 | 12/2005 | Polevoy et al. | |

* cited by examiner

*Primary Examiner*—Michael Trettel
(74) *Attorney, Agent, or Firm*—Buckingham, Doolittle & Burroughs, LLP

(57) ABSTRACT

Described herein is a cap for securing the interlocking members of a bed frame with flush rail support surfaces which includes a main body portion and a connection piece protruding from the main body portion of the cap. Also described herein is a method for securing the interlocking members of a bed frame with interlocking members and flush rail support surfaces.

10 Claims, 15 Drawing Sheets

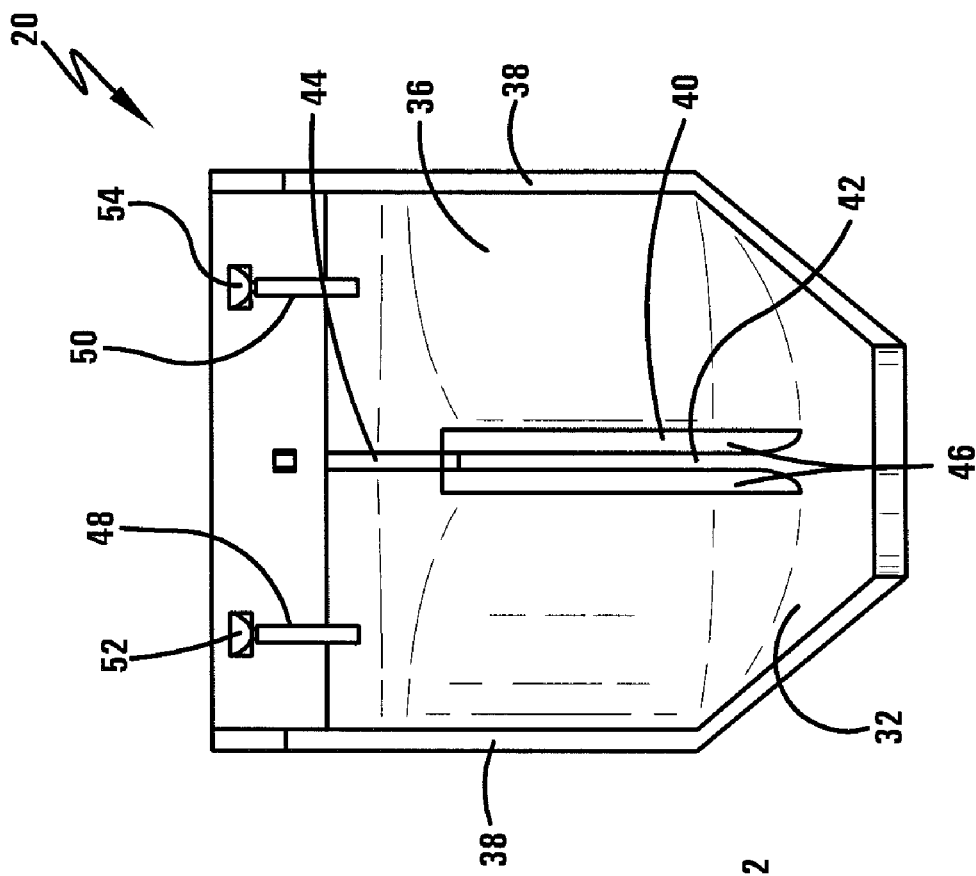
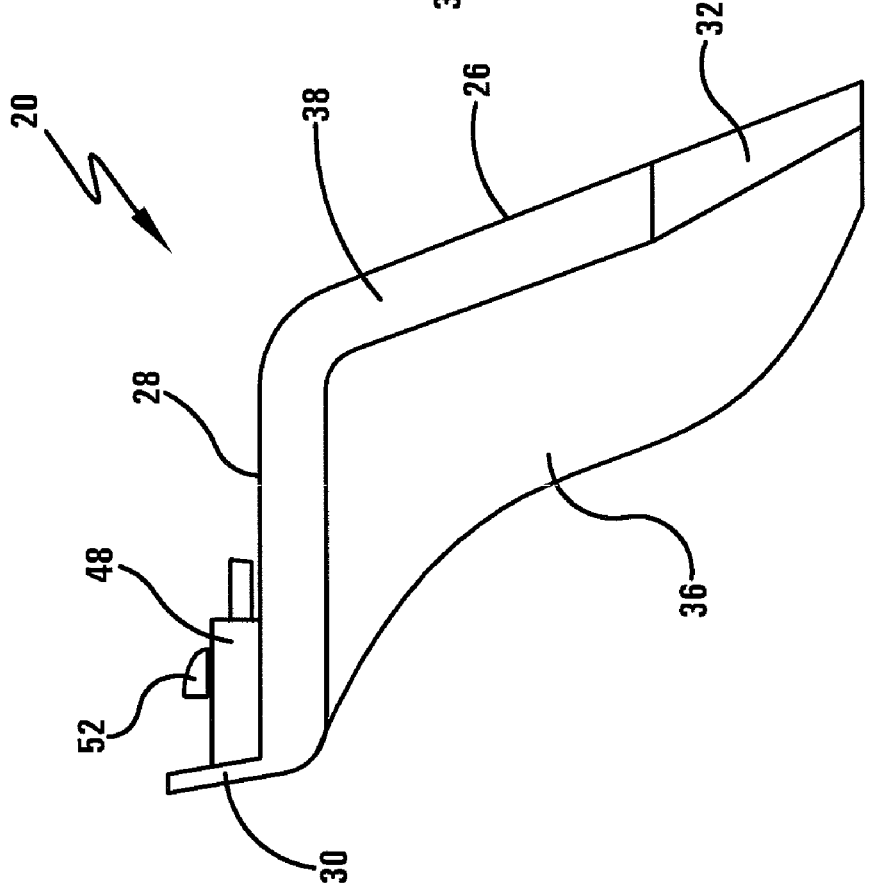
FIG-7
FIG-6

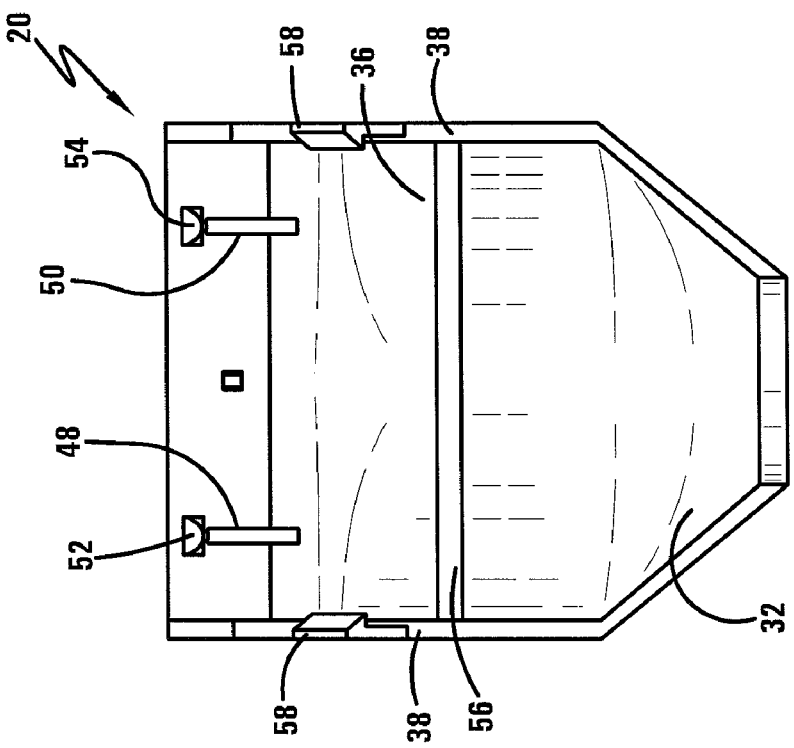
FIG-10
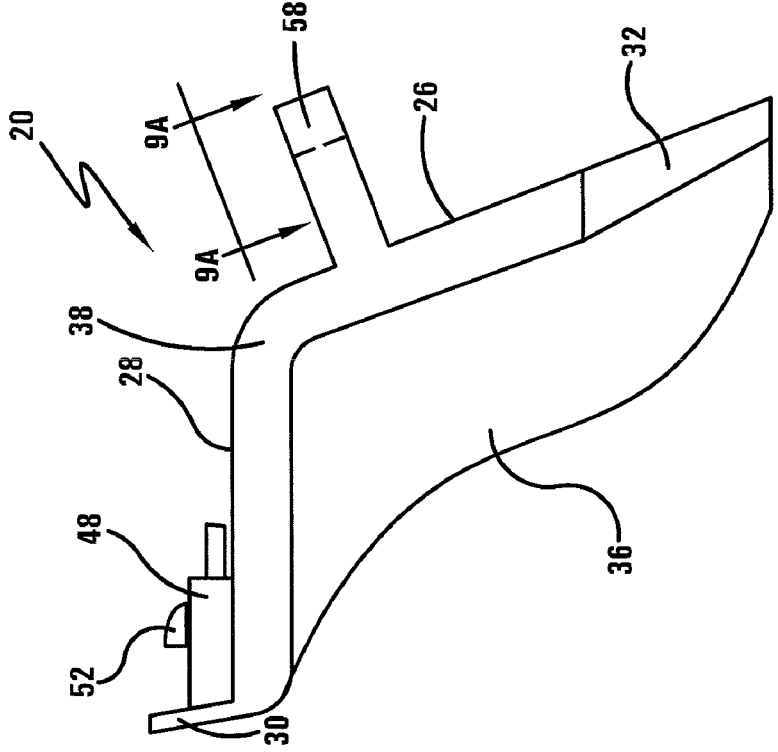
FIG-9A
FIG-9

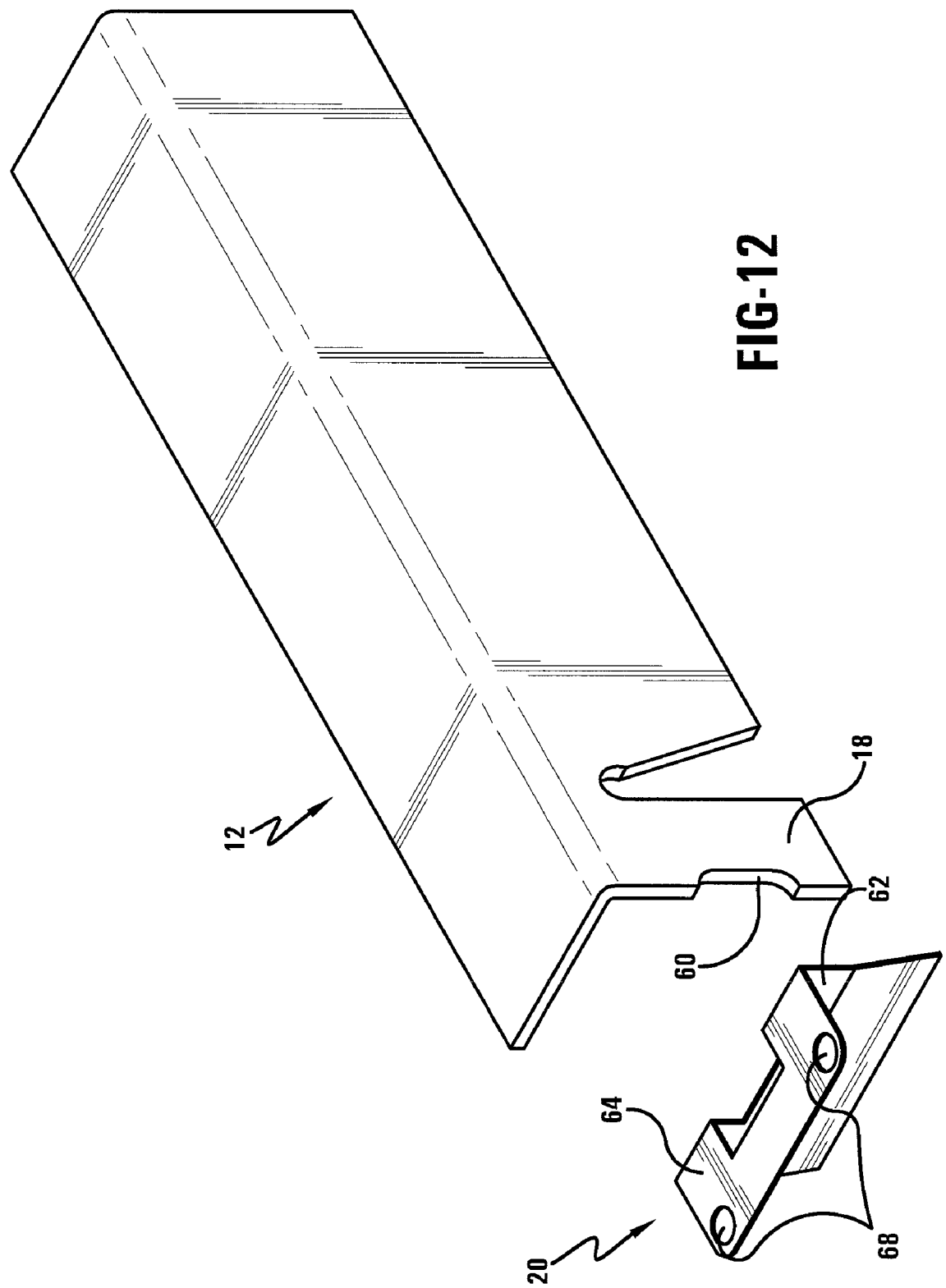

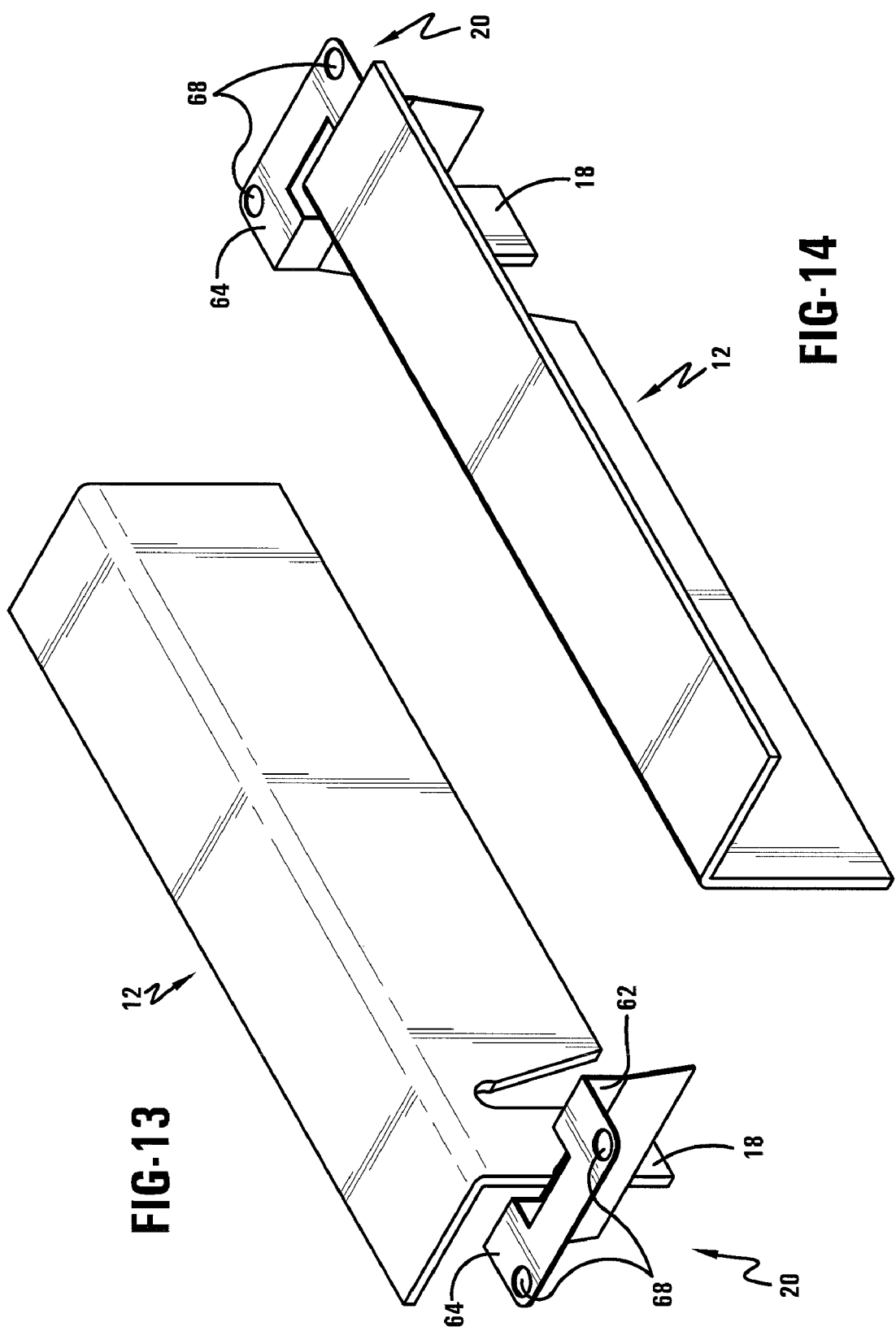

CAP FOR SECURING INTERCONNECTED LINEAR MEMBERS OF A FRAME STRUCTURE

TECHNICAL FIELD

The invention relates generally to accessories for frame structures and, more particularly, to a cap for securing interconnected linear members of an elevated frame structure, which can be assembled by an individual or end user.

BACKGROUND OF THE INVENTION

Bed frames are used to support a box spring and mattress several inches off the floor, and are commonly mounted upon casters at the four corners and optionally at intermediate points of the frame. Typically the bed frame consists of a plurality of generally L-shaped side and cross frame members detachably secured to one another for supporting the mattress and box spring unit between a foot board and head board. In the industry, the frame members are often made from recycled railroad rail steel which is heated, re-shaped and processed into the L-shaped configuration. This recycled steel has very high carbon content and high strength as compared to conventional structural component materials. In the prior art, the generally orthogonal frame members are connected at the intersections by brackets which are attached to the ends of the frame members. For example, U.S. Pat. No. 3,683,429 describes a bed frame wherein several bracket pieces are attached to both of the intersecting frame members. Frames are supported by casters held by caster mounting brackets which are attached to the frame members. The casters are held by brackets which are attached to the frame members. The steel from which such brackets are made is of significantly lower strength than that of the frame members. Thus, the strength of the frame members is not utilized at the intersections, where high load and moment forces occur. Also, the brackets represent a number of parts which must be fabricated and separately attached to the frame members. Some frame designs which include a center rail within a rectangular frame require as many as 22 or more bracket pieces and 44 to 48 or more fasteners such as rivets.

In some prior art bed frames, the box spring supporting surfaces of the intersecting frame members are not flush, i.e., not in the same plane. This occurs as a result of the complex bracket assemblies used to form the intersections, particularly those which rely on a tapered wedge type connection. Consequently, the wooden frame of a box spring and the mattress will warp and sag when placed on such frames, especially in the center.

A bed frame which utilizes the substantial strength of the frame members as an integral component of the frame intersections, which eliminates many bracket pieces, and which provides a truly flush support surface is described in U.S. Pat. No. 6,397,412. A bed frame structure, as described in the previously mentioned patent, has interlocking members and flush rail support surfaces and is shown in FIGS. 1-3 (PRIOR. ART). Flush bed frame 10 utilizes the terminal ends of rail member 12 as an integral structural connection to universal unibody caster mount 14 at the intersection of rail member 12 and caster mount 14. Slot 16 in caster mount 14 is configured to accept leg 18 of rail member 12 to precisely align the horizontal flanges of the intersecting rails to provide a truly flush support surface for a mattress box spring. No bracketry is required at the ends of rail member 12 for connection to caster mount 14, as slot 16 in caster mount 14 accepts a portion of rail member 12, creating a mechanical connection using the geometry of member 12 and caster mount 14. The caster mounts are of a universal configuration at each rail intersection of the flush bed frame. The rail-accepting slots in the caster mounts are configured to accept and receive one or two rail flanges.

One deficiency of the bracket-less connection of the design of the flush bed frame is the rail member easily separates from the caster mount when an upward force is applied to the rail member while the bed is in its standard position on the floor. The rail member also easily separates from the caster mount when the bed frame is rotated sideways or upside-down, as gravity forces the rail member apart from the caster mount.

Bed frames are often rotated sideways during the process of moving the bed frame to a new location to maneuver the frame such that it fits through doorways. Often when the bed frame is flipped the rail member separates from the caster mount, falling radially outwards towards the floor. The falling rail member can cause damage to the walls or floor of the house as it falls, as well as pose a safety hazard to any person standing in its path during the fall. A cap or other means capable of securing the interconnected linear members of the flush frame is not provided by the Prior Art.

Therefore, as shown in the Prior Art, there is still a need for a device to secure the bracket-less connection of the rail member to the caster mount of the flush bed frame design so as the members do not easily separate.

SUMMARY OF THE INVENTION

It is an object of this invention to describe a cap capable of securing the interconnected linear members of a flush bed frame.

It is a further object of this invention to describe a cap that secures the otherwise bracket-less connection between the members of the bed frame such that they do not easily separate when an upward directed force is applied to the top member, or the frame is flipped sideways or upside down.

It is yet another object of this invention to describe a cap that is easily installable by the user of the bed frame or is pre-installed prior to receipt by the end user while improving the aesthetics of the bed frame.

The invention provides a cap with a connection such that the cap secures the rail member to the caster mount preventing the rail member from separating from the caster mount when the bed frame is rotated on its side or upside down. In one embodiment of the invention a connection exists between the cap and the portion of the rail member protruding through the slot in the caster mount, so that the cap acts as a positive stop against the caster mount. The cap secures over the open outward-facing portion of the caster mount, covering the volume created by the curve of the outer-facing wall of the caster mount. The cap encloses the portion of the rail member inserted into the slot in the caster mount between the cap and the outer wall of the caster mount and includes a means for securing the portion of the rail member inserted into the slot in the caster mount such that the rail member cannot easily separate from the caster mount.

In a further embodiment of the invention the cap may not enclose the volume created by the curve of the outer facing wall of the caster mount, and may instead have a portion of the cap inserted into a cut-out in the rail member, and is positioned between the caster mount and the rail member. The cap may have a portion that is secured to the caster mount, creating a connection between the caster mount and rail member.

These and other objects of the present invention will become more readily apparent from a reading of the following detailed description taken in conjunction with the accompanying drawings wherein like reference numerals indicate similar parts, and with further reference to the appended claims.

BRIEF DESCRIPTION OF THE DRAWINGS

The invention may take physical form in certain parts and arrangements of parts, numerous embodiments of which will be described in detail in the specification and illustrated in the accompanying drawings which form a part hereof, and wherein:

FIG. 6 is a side elevational view of the cap of an embodiment of this invention;

FIG. 7 is a rear elevational view of the cap of an embodiment of this invention;

FIG. 9 is a side elevational view of the cap of another embodiment of this invention with a full width ledge and extended side members;

FIG. 9A is a cross-sectional view of FIG. 9 on the plane 9-A illustrating the extended side member;

FIG. 10 is a rear elevational view of the cap of FIG. 9;

FIG. 12 is a side perspective view of the cap of yet another embodiment of this invention in line with a rail member of the flush bed frame;

FIG. 13 is a side perspective view of the cap of an embodiment of this invention positioned in the cut-out of a rail member of the flush bed frame;

FIG. 14 is a back side perspective view of the cap of an embodiment of this invention positioned in the cut-out of a rail member of the flush bed frame;

DETAILED DESCRIPTION OF THE INVENTION

Figure 1:
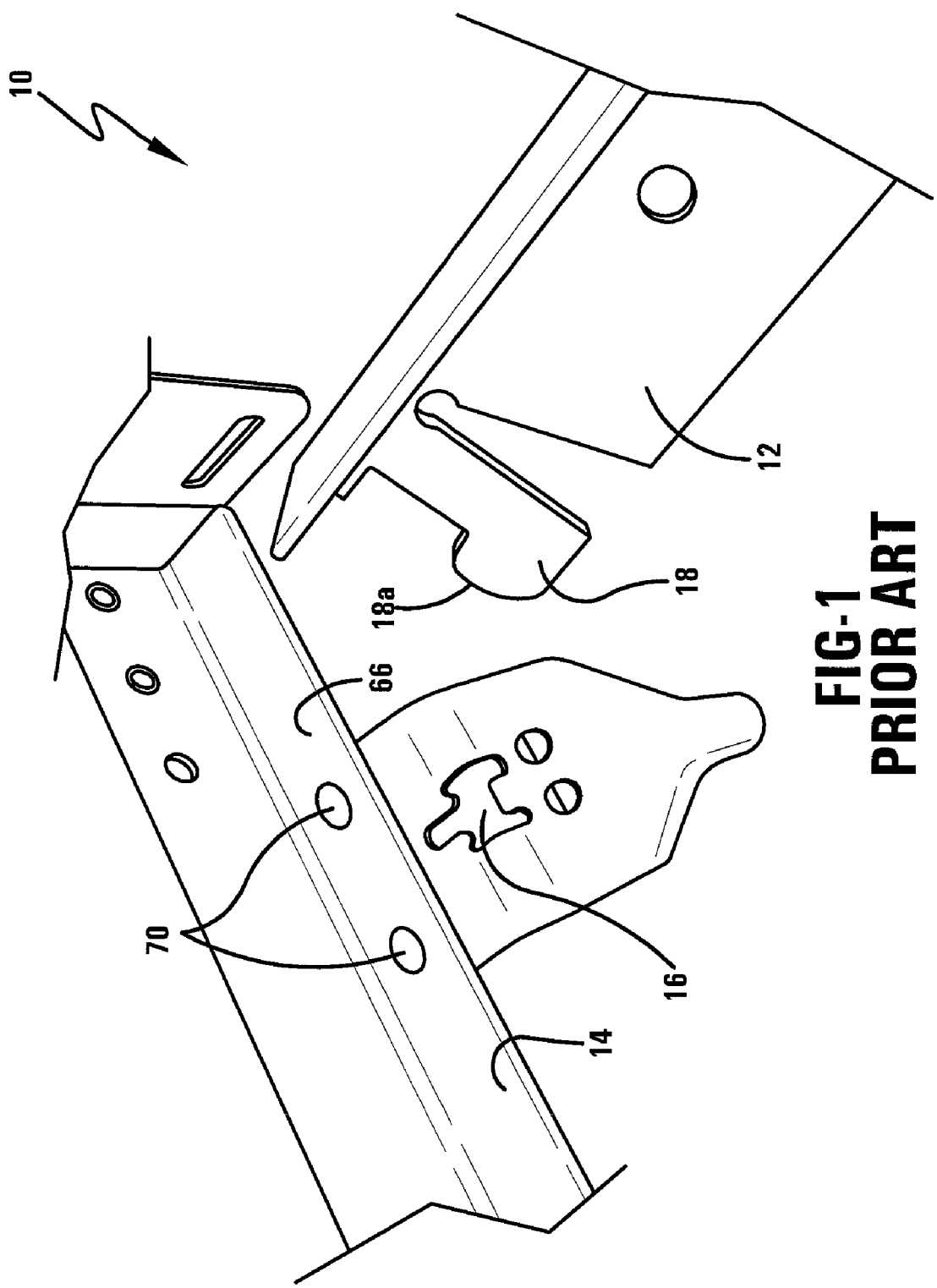
FIG. 1 is a perspective view of the unconnected caster mount and rail member of the flush bed frame of Prior Art.

Referring now to the drawings wherein the showings are for purposes of illustrating numerous embodiments of the invention only and not for purposes of limiting the same, the figures illustrate the novel idea of a cap for securing interconnected linear members of a frame structure such as a flush bed frame.

FIGS. 4-7 illustrate one embodiment of the cap of this invention. Cap 20 has a main body portion that includes two broad main faces: outer face 22 on the front of cap 20 and inner face 24 on the back of cap 20. Outer face 22 is primarily aesthetic, as it is the face that is seen when the cap is integrated with the bed frame. Outer face 22 may include engraving, etching, writing, or other markings of identification related to the cap, such as the manufacturer's name or the part number. Outer face 22 will commonly be outwardly curved for aesthetic integration with the physical structure of the bed frame it is connected to, but may also be flat or concave. The shape of the outer face 22 is limited by the physical structure of the interconnected members of the flush bed frame that the cap is securing such that the shape of the outer face of the cap must allow sufficient distance for the cap to properly secure the interconnecting members of the bed frame. Inner face 24 will face inwards connecting with the interconnecting members of the bed frame structure and will not be seen by the user once installed on the bed frame.

The cap of this invention may have any shape or configuration such that it properly integrates with the bed frame structure. The shape and curvature of the physical structure of the cap will often be such that it follows the outer profile of the caster mount. In the embodiment of the invention shown in FIGS. 4-7, cap 20 has a substantially vertical lower section 26 that sharply curves into a substantially horizontal mid-section 28, which shortly thereafter again sharply curves into another substantially vertical upper section 30. Vertical lower section 26 includes tapered section 32 near the bottom of vertical lower section 26 and terminates with rounded cut-out section 34 to integrate with the curved body of caster mount 14 for proper fit and improved appearance when cap 20 is installed on the bracket-less connection of bed frame 10. Main center portion 36 of cap 20 is perpendicular to the directionality of the rail member the cap is securing, however two side sections 38 wrap around the sides of the caster mount, forming a 90° angle with main center portion 36 and running parallel with the directionality of the rail member the cap is securing.

Cap 20 includes a connection piece for connecting cap 20 to portion 18 of rail member 12, with such connection between cap 20 and rail member 12 occurring on the bulbous portion 18a of leg 18 protruding through slot 16 in caster mount 14. The connection between cap 20 and bulbous portion 18a of leg 18 protruding through slot 16 secures the bracket-less connection between rail member 12 and caster mount 14, by holding rail member 12 in the connected position, with the cap acting as a positive stop against caster mount 14 when upward disengaging pressure is applied in a way that would separate rail member 12 and caster mount 14 if the cap did not hold rail member 12 in place. In one embodiment of the invention, lower section 26 further includes a centrally positioned vertical support member 40 which comprises a pair of essentially parallel vertical ribs 46 which define aperture or vertical slot 42. The width of vertical slot 42 is such that bulbous portion 18a of leg 18 of rail member 12 fits snugly within the slot when inserted therein.

A second essentially vertical rib 44 protrudes from horizontal mid-section 28, connecting to vertical member 40 to provide additional support to vertical member 40 and prevent the two sides 46 of vertical member 40 created by vertical slot 42 from bending inward or outward, or cracking from cap 20. Cap 20 provides a connection between vertical slot 42 and portion 18 of rail member 12 protruding through slot 16 in caster mount 14, acting as a physical guide for correct positioning of cap 20. Further vertical pieces, such as vertical pieces 48 and 50, may optimally exist to provide support for the physical structure of cap 20 and prevent buckling, bending, cracking or deformation of cap 20. Vertical pieces 48 and 50 also exist to support and correctly position securing pieces 52 and 54. When cap 20 is correctly positioned over rail member 12 and caster mount 14, securing pieces 52 and 54 fit into corresponding receiving cavities such that the cap is secured to rail member 12 and caster mount 14 preventing rail member 12 from separating from caster mount 14 when bed frame 10 is rotated on its side or upside down.

Figure 2:
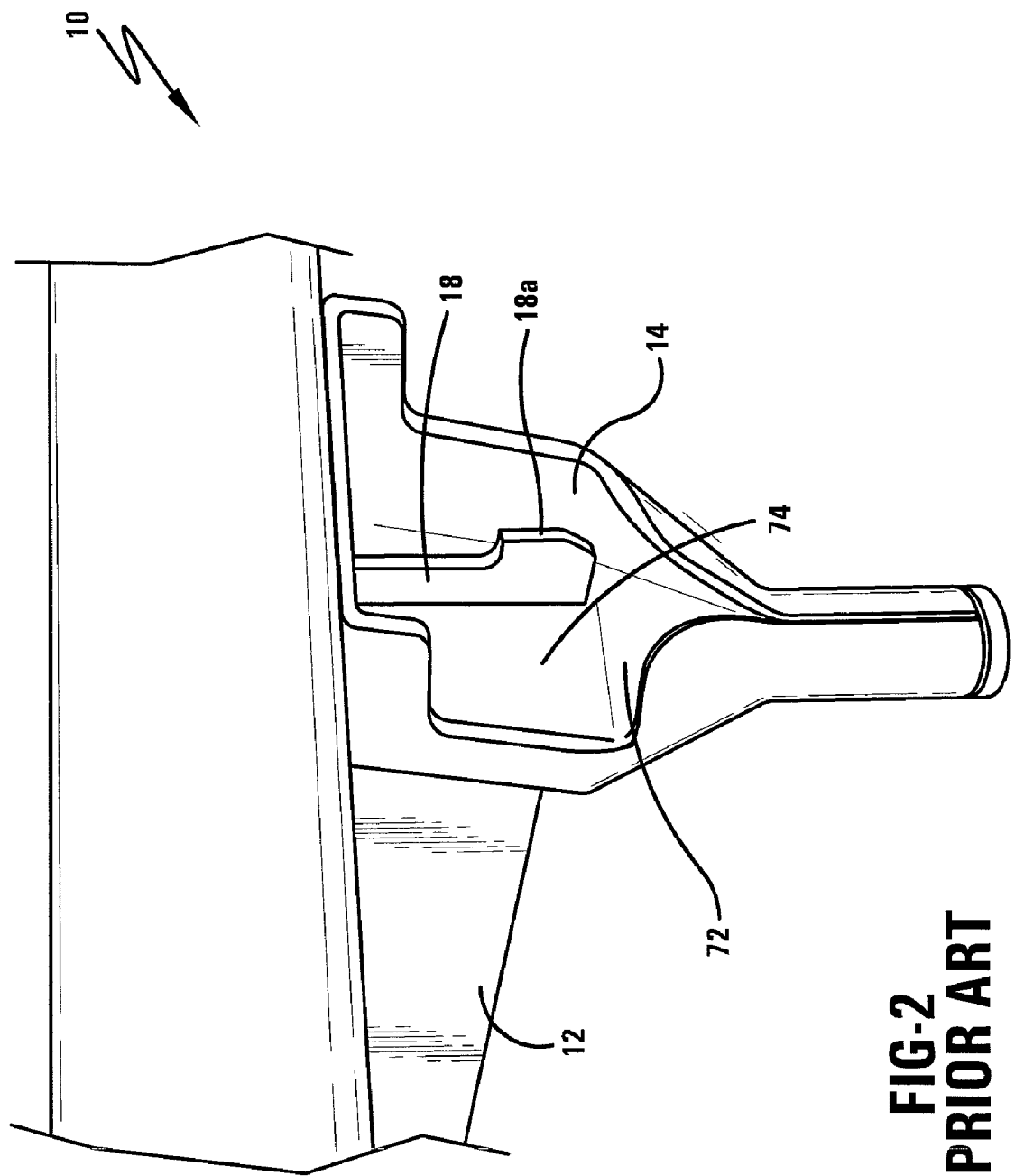
FIG. 2 is a front perspective view of the connected caster mount and rail member of the flush bed frame of Prior Art.
Figure 3:
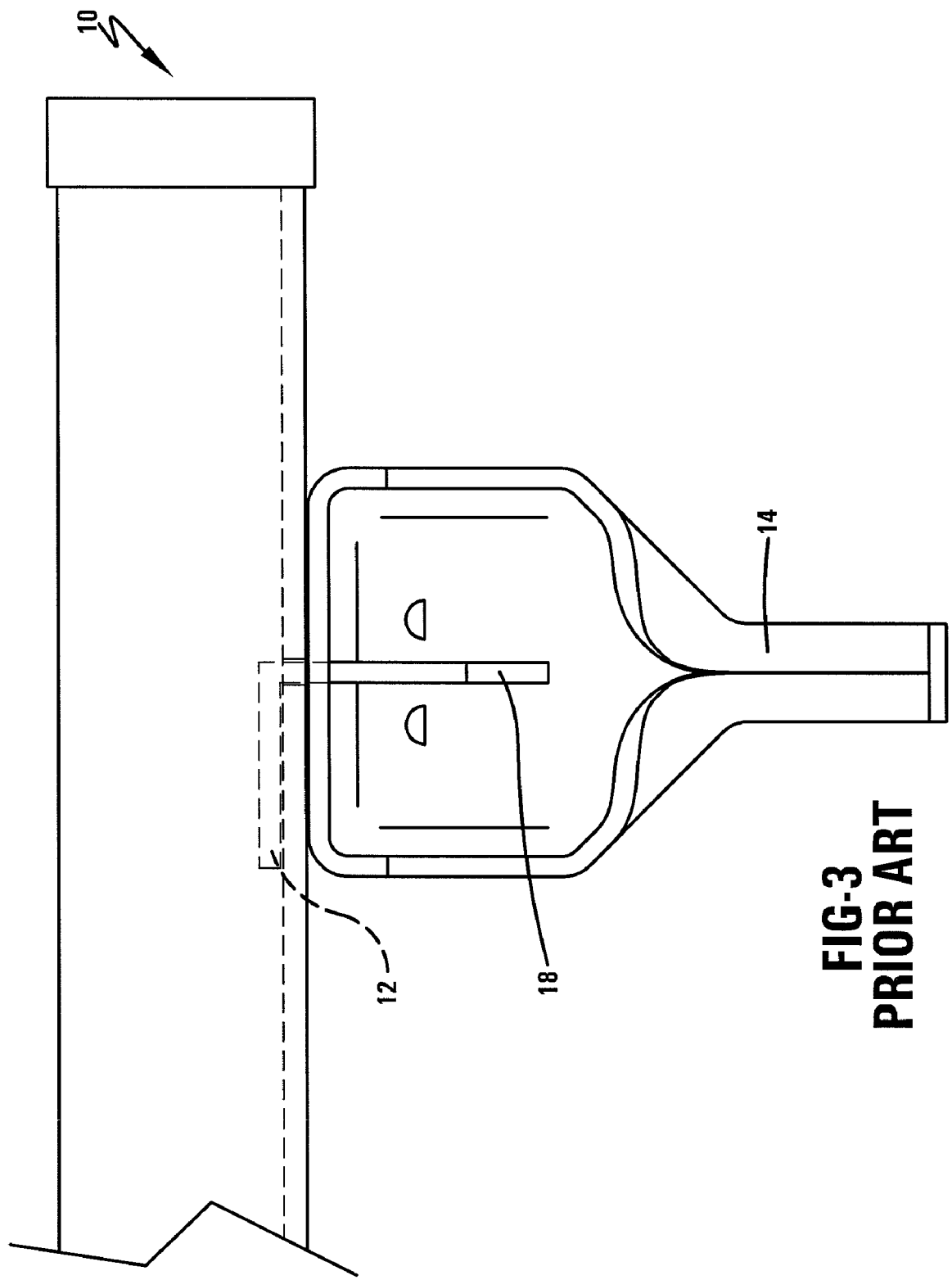
FIG. 3 is a front elevational view of the connected caster mount and rail member of the flush bed frame of Prior Art.
Figure 4:
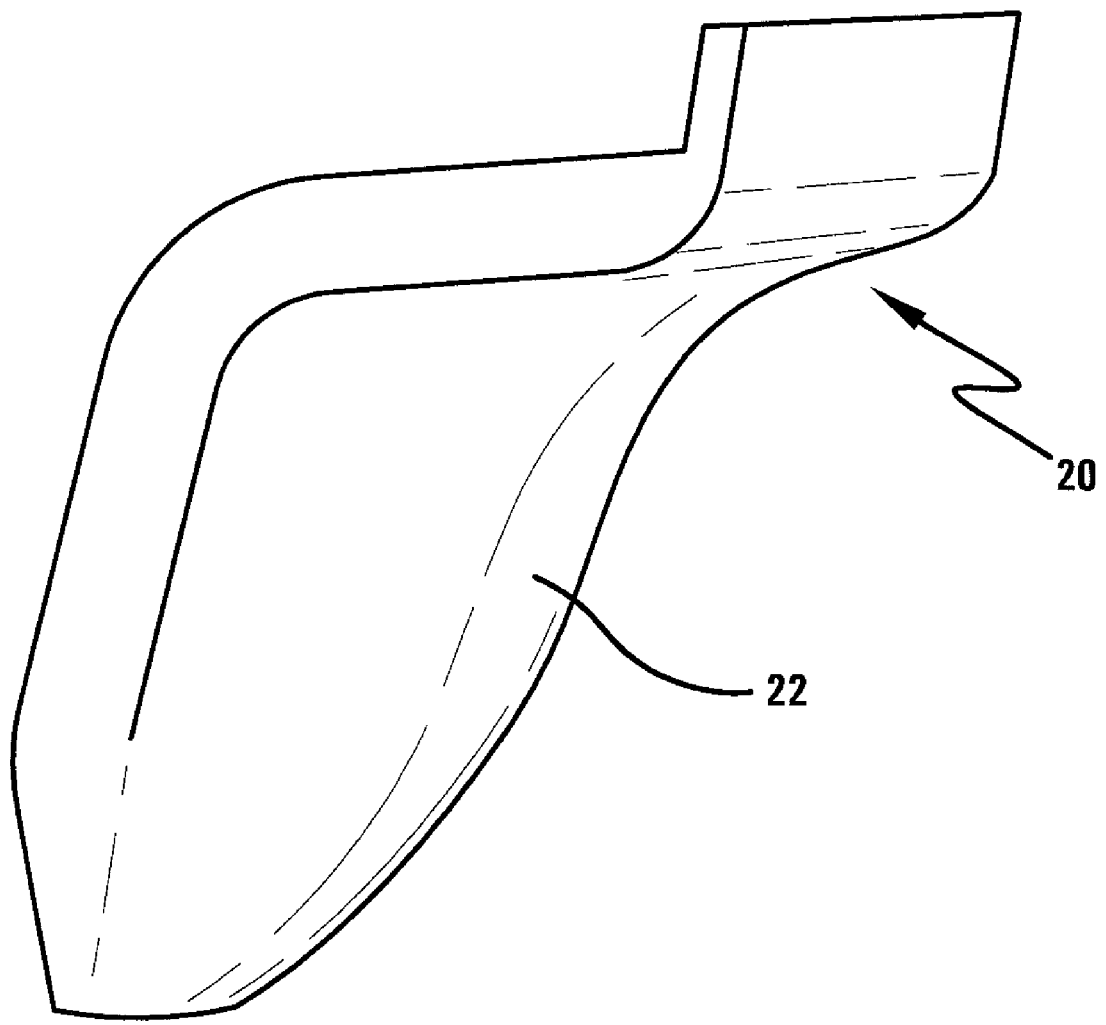
FIG. 4 is a front perspective view of the cap of an embodiment of this invention.
Figure 5:
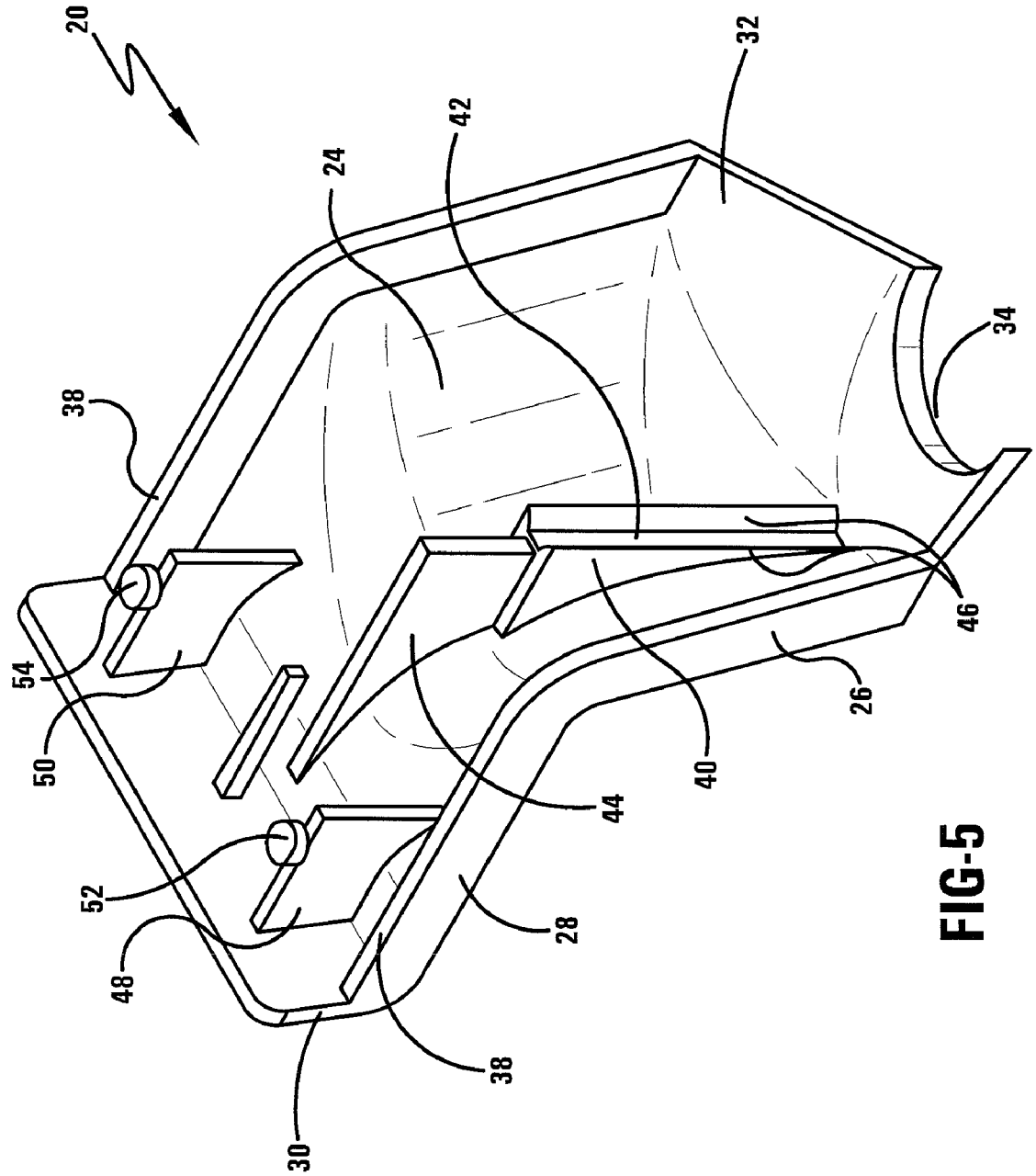
FIG. 5 is a back perspective view of the cap of an embodiment of this invention.

Cap 20 secures over open outward-facing portion 72 (as shown in FIGS. 2-3 (Prior Art)) of caster mount 14, covering the volume created by the curve of outer-facing wall 74 of caster mount 14. Cap 20 encloses leg 18 of rail member 12 inserted into slot 16 in caster mount 14 between cap 20 and outer wall 74 of caster mount 14 and includes a 11 securing means for securing the portion of rail member 12 inserted into slot 16 in caster mount 14 such that rail member 12 cannot easily separate from caster mount 14.

A common embodiment of cap 20 is manufactured from a plastic material, however, cap 20 may be made from a variety materials, a non-limiting list including polymeric materials, rubber materials or metals. The material used may be but is not required to be stiff, but flexibility of the material is limited by its ability to substantially maintain the physical form of the cap, so as not to flex so much as to release the connection between vertical slot 42 and leg 18 of rail member 12 or bend to the point of significant deformation such that the cap no longer performs its intended purpose.

Figure 8:
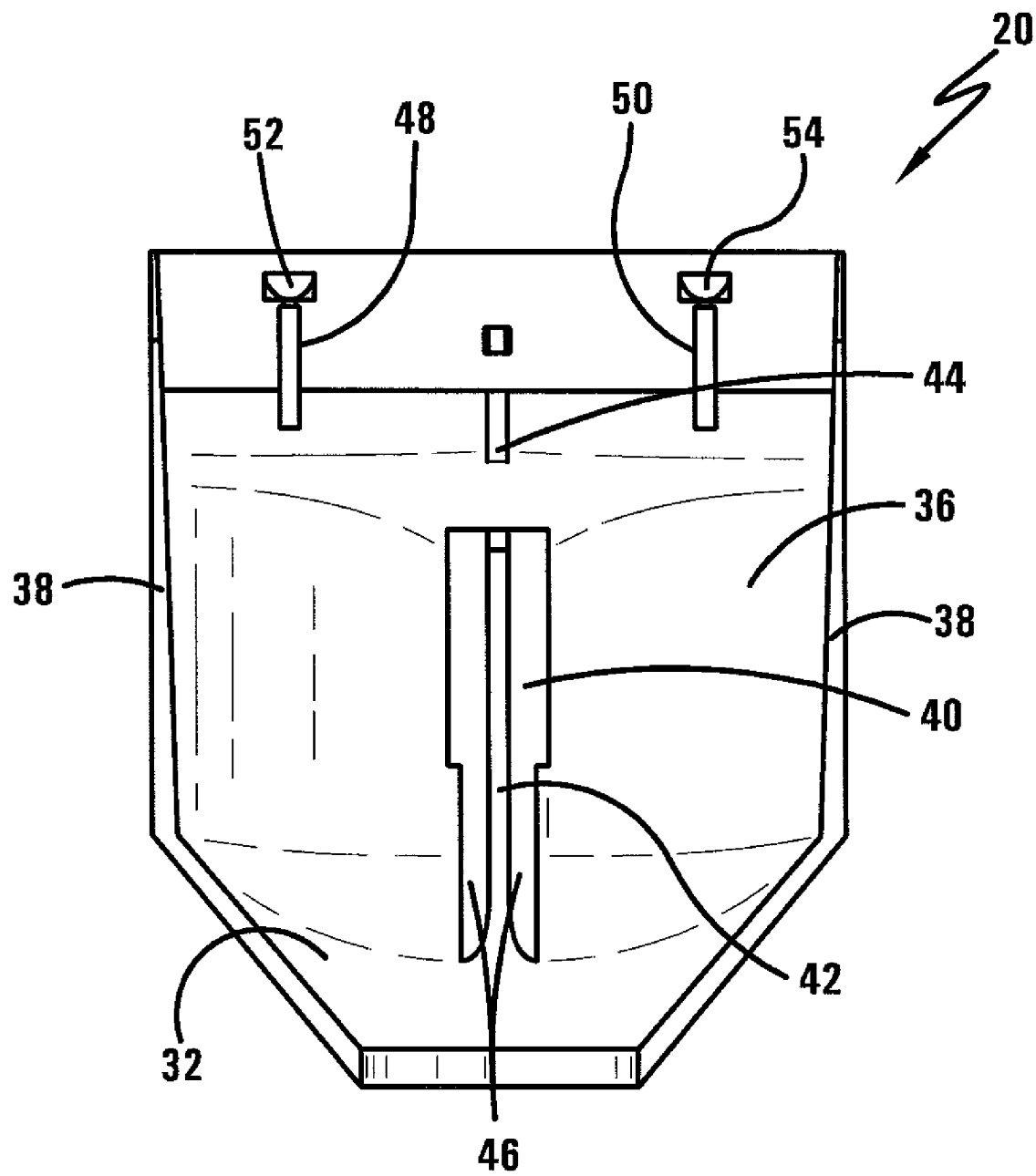
FIG. 8 is a rear elevational view of the cap of a further embodiment of this invention with differing dimensions.

The dimensions of the cap may vary, as is appropriate for the final use of the product. An embodiment of the cap with differing dimensions is shown in FIG. 8. The width of vertical slot 42 has been increased, and side sections 38 are wider, wrapping further up the sides of caster mount 14. Vertical rib 44 is also shorter and less prominently protruding from cap 20.

The protrusions abutting from bed cap 20 are not limited to those shown in the previous figures or described above. An example of bed cap 20 with a different configuration of protruding parts is shown in FIG. 9, FIG. 9A, and FIG. 10. Bed cap 20 may have horizontal rib 56 which extends across the full width of cap 20, instead of vertical slot 42 (FIGS. 5-8), as vertical slot 42 is used as a guiding mechanism for the portion of rail member 12 that fits within the volume enclosed by cap 20 and is not required or necessary for the design of cap 20. Horizontal rib 56 may act as a positive stop, stopping the portion of rail member 12 enclosed within the volume enclosed by cap 20 when properly positioned for pieces 52 and 54 to be firmly held in place, connecting the cap to rail member 12 and caster mount 14. Side members 58 extend from side sections 38, wrapping further around caster mount 14, increasing the strength of the connection between cap 20, rail member 12, and caster mount 14. Side members 58 may have an outwardly protruding section near the tip of side members 58 that acts to further secure cap 20 to caster mount 14, as shown in FIG. 9A.

Figure 11:
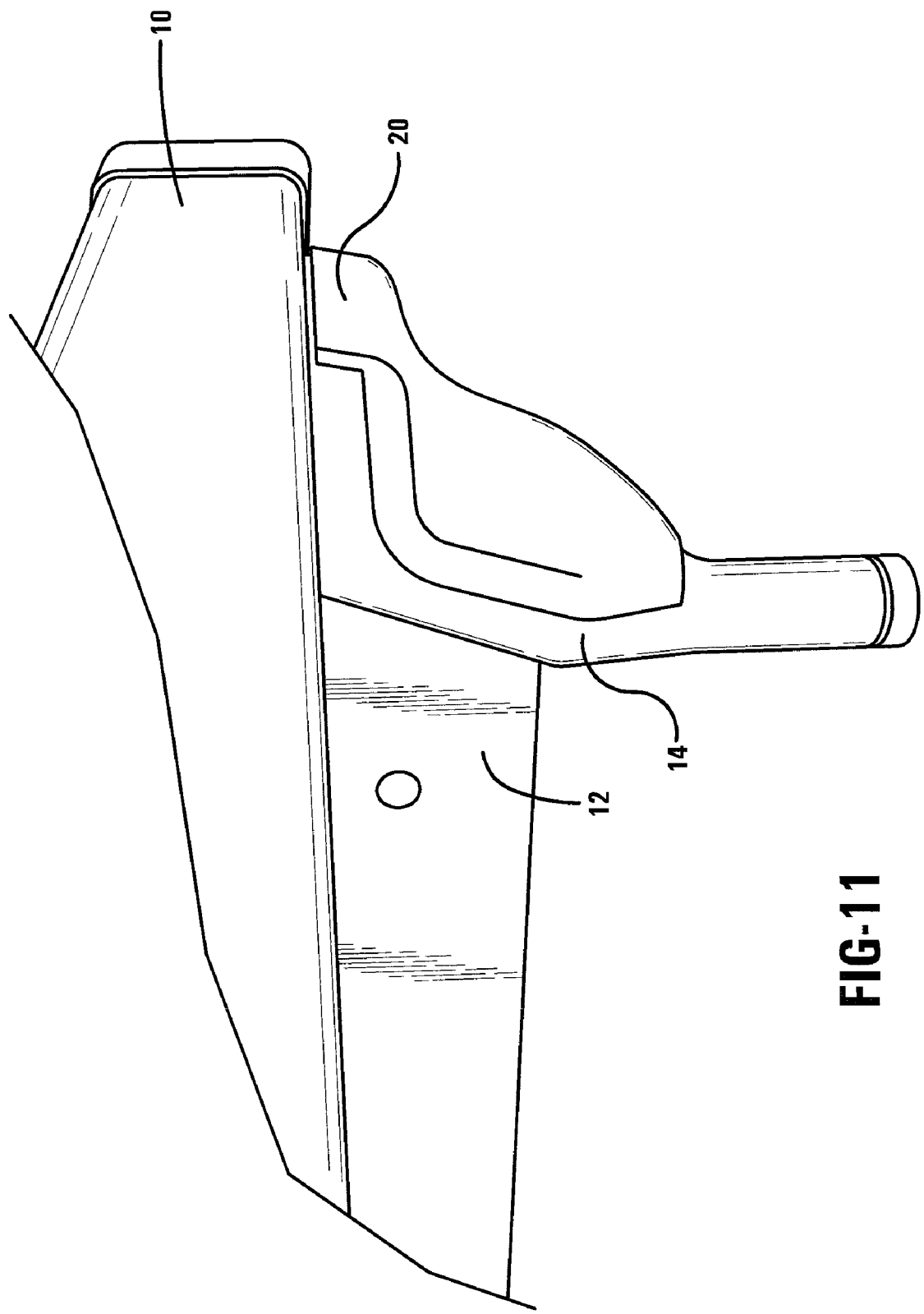
FIG. 11 is a side perspective view of the cap of an embodiment of this invention installed on the flush bed frame of Prior Art.
Figure 15:
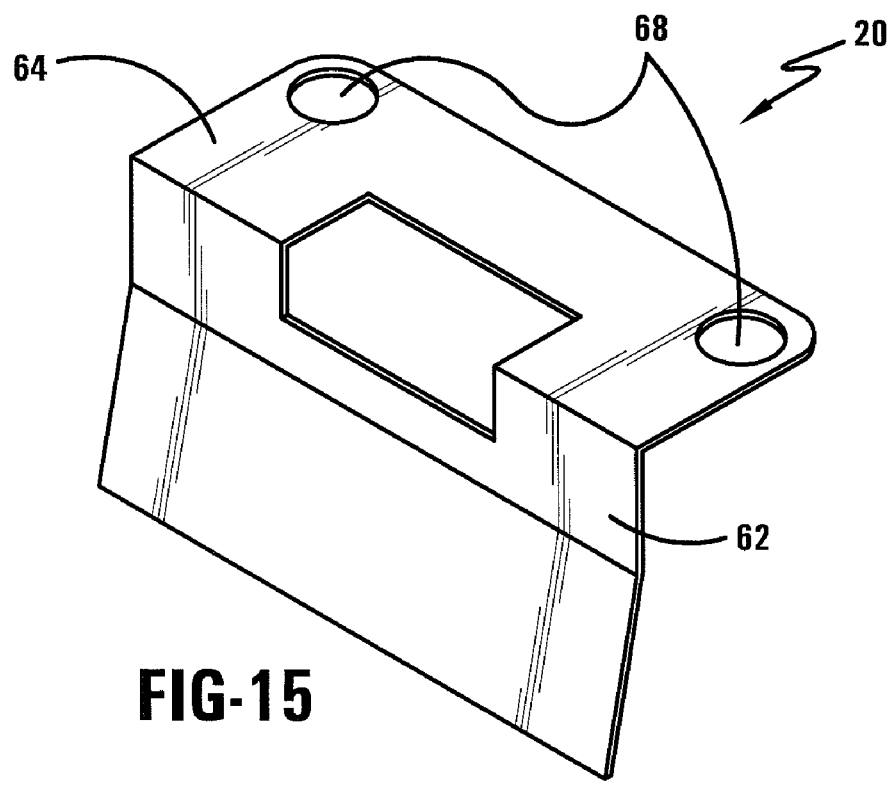
FIG. 15 is a back perspective view of the cap of an embodiment of this invention.

FIG. 11 illustrates cap 20 as it integrates with bed frame 10. The cap of one embodiment of this invention integrates with the bed frame described in U.S. Pat. No. 6,397,412. Cap 20 may, however, be designed to integrate with any bed frame with a similar connection whereby members of the bed frame are interconnected without the use of brackets.

To integrate cap 20 and bed frame 10, cap 20 should be aligned to properly match the profile of caster mount 14, with inner face 24 facing towards caster mount 14 of bed frame 10, side sections 38 overlapping the sides of caster mount 14, and vertical lower section 26, horizontal mid-section 28, and vertical upper section 30 aligned with the corresponding vertical and horizontal sections of caster mount 14. When pressure is applied pushing cap 20 towards caster mount 14, portion 18 of rail member 12 inserts into vertical slot 42 in vertical member 36 and should fit snugly so that rail member 12 does not separate from cap 20 under the pressure of gravity when bed frame 10 is flipped on its side or upside down. Pressure forcing portion 18 of rail member 12 into vertical slot 42 is continually applied until portion 18 is fully inserted into vertical slot 42. The edges of cap 20 fit flush with the edges of the open outward-facing portion of caster mount 14, covering the volume created by the shape of the outer-facing wall of caster mount 14. Cap 20 encloses portion 18 of rail member 12 inserted into slot 16 in caster mount 14 (as shown in FIGS. 2-3) between cap 20 and the outer wall of caster mount 14 and secures portion 18 of rail member 12 within vertical slot 42 such that rail member 12 cannot easily separate from caster mount 14. When upward pressure is applied to rail member 12 while bed frame 10 is in the standard feet down position, or when the bed frame is flipped on its side or upside down, rail member 12 is kept firmly in place by cap 10 as it is secured within vertical slot 42 and the edges of the physical structure of cap 20 are supported against the physical structure of caster mount 14.

Another embodiment of the invention is illustrated in FIGS. 12-15. Cap 20, of this embodiment, which may also commonly be referred to as a clip, includes a main body portion that is substantially vertical. Cap 20 of this embodiment of the invention is positioned such that mainly vertical section 62 of cap 20 is aligned within cut-out 60. When leg 18 of rail member 12 is inserted into slot 16 of caster mount 14, cap 20 is positioned between rail member 12 and caster mount 14. A substantially horizontal connection piece 64 of cap 20 extends from vertical section 62 of cap 20 over horizontal section 66 (FIG. 1) of caster mount 14. Holes 68 in horizontal section 64 of cap 20 align with the corresponding holes 70 (FIG. 1) on horizontal section 66 of caster mount 14, such that a screw, pin, or other connecting device can secure cap 20 to caster mount 14. Once cap 20 of this embodiment is positioned within cut-out 60 of rail member 12, between rail member 12 and caster mount 14, and secured to caster mount 14, cap 20 functions to secure rail member 12 and caster mount 14 such that the members cannot separate inadvertently under the pressure of gravity when the bed frame is lifted or turned on its side.

Figure 16:
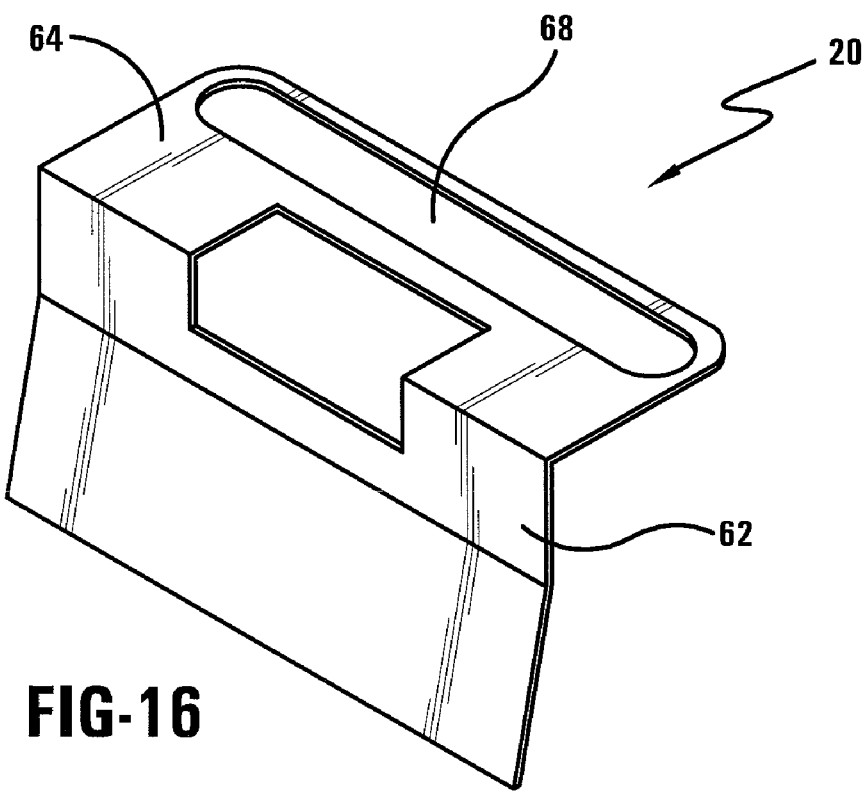
FIG. 16 is a back perspective view of the cap of an embodiment of this invention with an extended oval connection hole.
Figure 17:
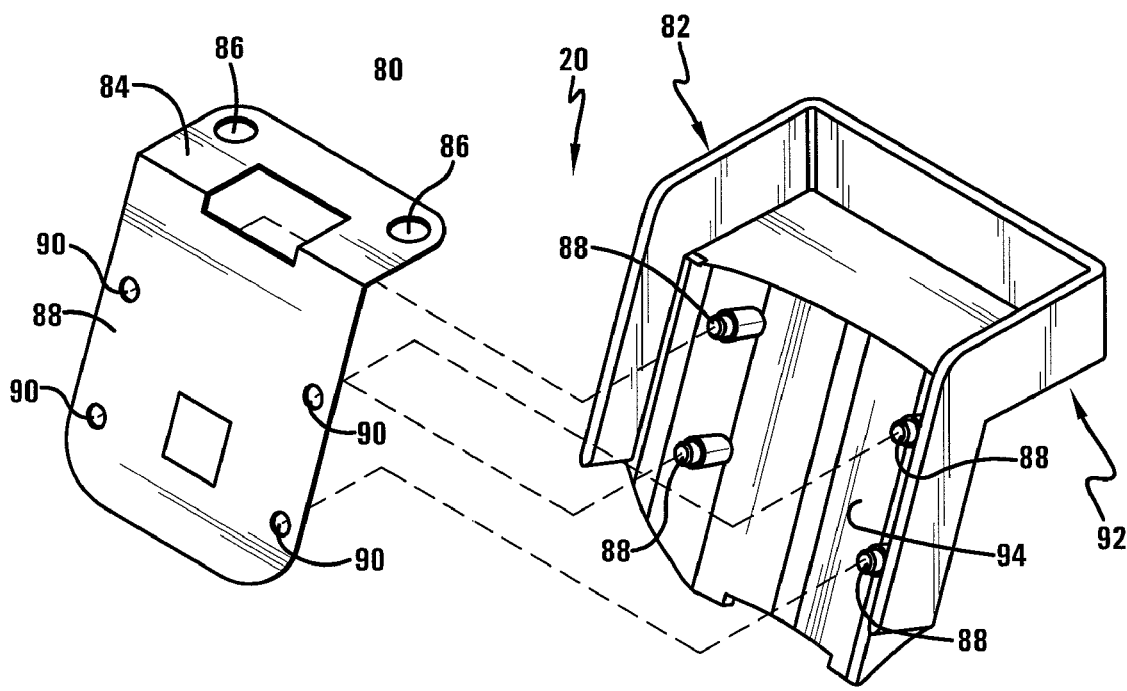
FIG. 17 is a rear perspective view of an embodiment of a disassembled two-piece cap of this invention.
Figure 18:
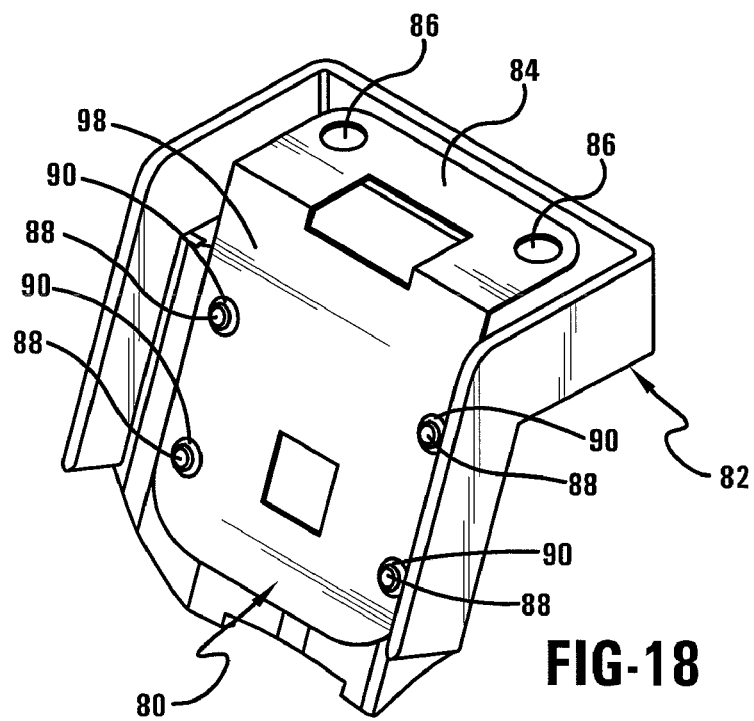
FIG. 18 is a rear perspective view of an embodiment of an assembled two-piece cap of this invention.
Figure 19:
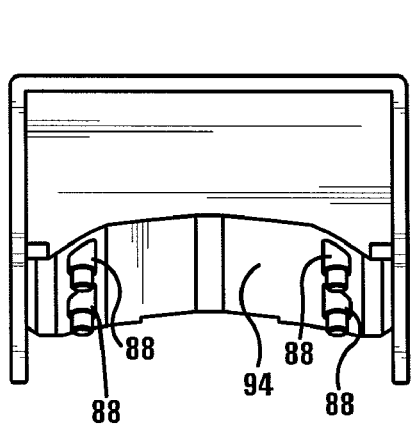
FIG. 19 is a top elevational view of an embodiment of the cover portion of a two-piece cap of this invention.
Figure 20:
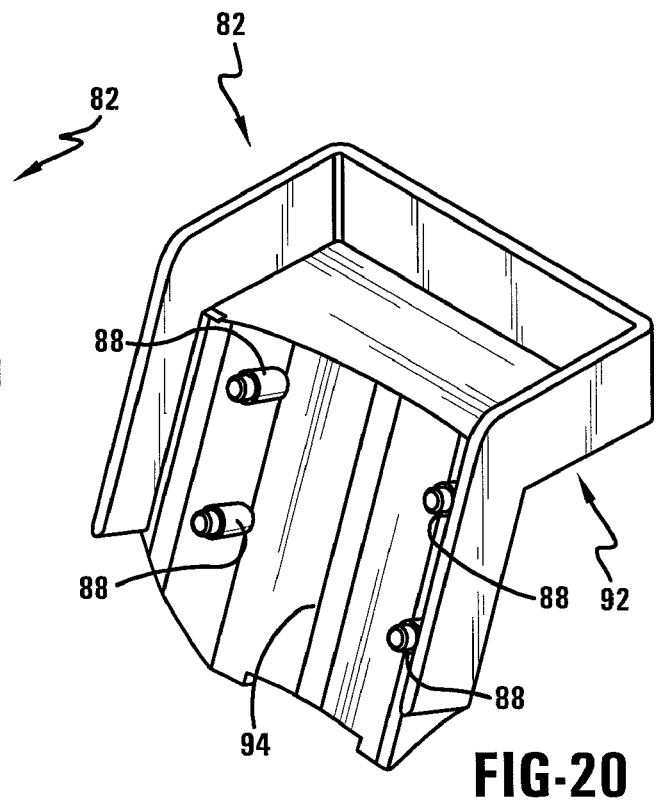
FIG. 20 is a front perspective view of an embodiment of the cover portion of a two-piece cap of this invention.
Figure 21:
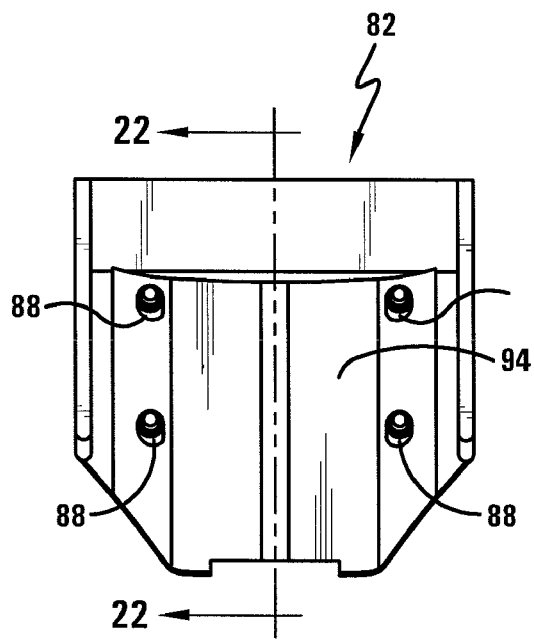
FIG. 21 is a front elevational view of an embodiment of the cover portion of a two-piece cap of this invention.
Figure 22:
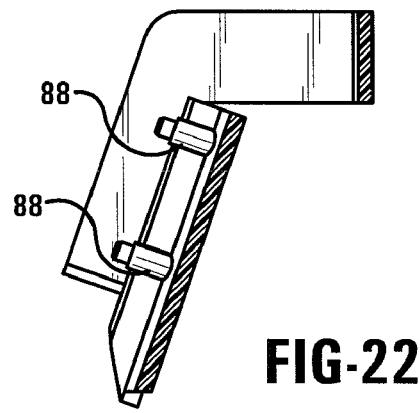
FIG. 22 is a cross-sectional elevational view of the embodiment of the cover portion of the two-piece cap of this invention taken along the plane A-A.
Figure 23:
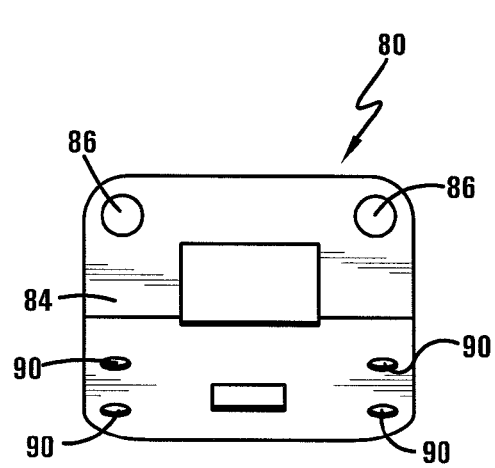
FIG. 23 is a top perspective view of an embodiment of the clip portion of a two-piece cap of this invention.
Figure 24:
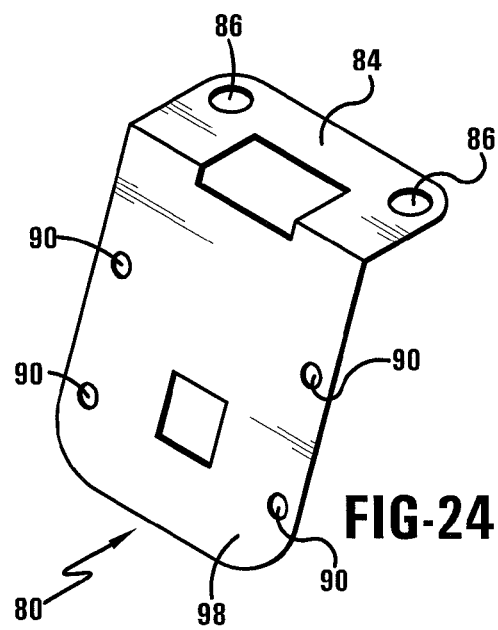
FIG. 24 is a front perspective view of an embodiment of the clip portion of a two-piece cap of this invention.
Figure 25:
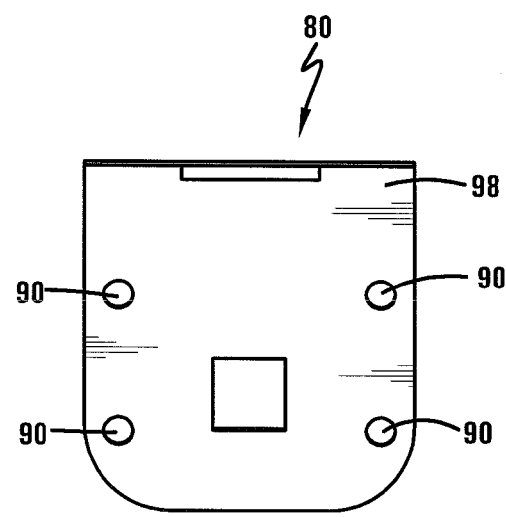
FIG. 25 is a front elevational view of an embodiment of the clip portion of a two-piece cap of this invention.
Figure 26:
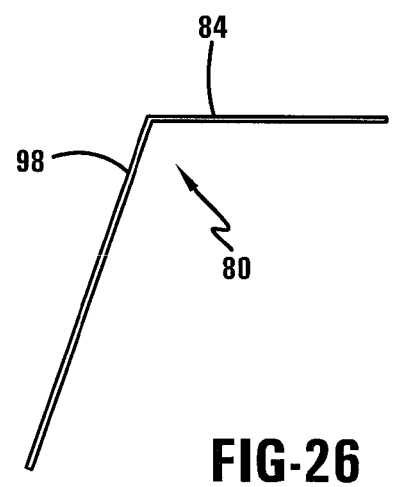
FIG. 26 is a side elevational view of an embodiment of the clip portion of a two-piece cap of this invention.

Cap 20 of this embodiment is not limited to two holes 68, as more or fewer holes may exist for securing cap to rail member 12. One long oval shaped hole 68 (FIG. 16) may also exist to secure cap 20 to rail member 12. Cap 20 may be any color or made of any material capable of maintaining the shape without deformation to the extent the cap would no longer serve its essential purpose.

A further embodiment of the present invention is illustrated by FIGS. 17-26. The embodiment shown in FIGS. 17-26 is a two-piece cap (shown disassembled in FIG. 17, and assembled in FIG. 18) that includes a cover portion (shown in FIGS. 19-22) and a clip portion (shown in FIGS. 23-26). Clip portion 80 of cap 20 connects rail member 12 and caster mount 14, while cover portion 82 of cap 20 connects to clip portion 80 to effectively cover the volume created when rail member 12 and caster mount 14 are joined.

Clip 80 generally includes substantially vertical portion 98, that acts as the main body portion of cap 20. Clip 80 further includes substantially horizontal section 84, that acts as the connection piece, extending from the main body portion. Clip 80 is positioned to align with rail member 12, such that when leg 18 of rail member 12 is inserted into slot 16 of caster mount 14, clip 80 is positioned between rail member 12 and caster mount 14. Horizontal section 84 of clip 80 extends under horizontal section 66 (FIG. 1) of caster mount 14, and holes 86 in horizontal section 84 of clip 80 align with the corresponding holes 70 (FIG. 1) on horizontal section 66 of caster mount 14, such that a screw, pin, or other connecting device can secure clip 80 to caster mount 14. Bulbous portion 18a of leg 18 extends through opening 100 in clip 80. Once clip 80 of this embodiment is positioned between rail member 12 and caster mount 14, and secured to caster mount 14, clip 80 functions to secure rail member 12 and caster mount 14 such that the members cannot separate inadvertently under the pressure of gravity when the bed frame is lifted or turned on its side.

Cover portion 82 of cap 20 is generally composed of outer face 92 and inner face 94, with protruding members 88 extending outward from inner face 94. Outer face 92 is primarily aesthetic, as it is the face that is seen when the cap using the cover is integrated with the bed frame. Outer face 92 may include engraving, etching, writing, or other markings of identification related to the cap, such as the manufacturer's name or the part number. Outer face 92 will commonly be outwardly curved for aesthetic integration with the physical structure of the bed frame it is connected to, but may also be flat or concave. The shape of the outer face 92 is limited by the physical structure of the interconnected members of the flush bed frame that the cap is securing such that the shape of the outer face of the cover must allow sufficient distance for the cover to properly connect with the clip portion of the cap. Inner face 94 will face inwards connecting with the clip portion of the cap and will not be seen by the user once installed on the bed frame. The cover of the two-piece cap embodiment of this invention may have any shape or configuration such that it properly integrates with the clip portion of the cap and the bed frame structure. The shape and curvature of the physical structure of the cover will often be such that it follows the outer profile of the caster mount.

Cover 82 is positioned such that protruding members 88 in cover 82 align with openings 90 in clip 80, such that protruding members 88 are positioned for insertion into openings 90. The insertion of protruding members 88 into openings 90 allow for the connection of cover 82 to clip 80. In other embodiments of the invention using the two-piece cap, openings may exist in the cover piece, in the place of the protruding members, such that the openings in the cover can align with the openings in the clip, and any combination of screws, pins, or other connecting devices can be inserted into the aligned openings to secure cover 82 to clip 80. When cover 82 and clip 80 are connected, cover 82 effectively covers or hides the volume created by the connection between rail member 12 and caster mount 14.

Clip 80 of this two-piece embodiment is not limited in the number of holes 86, as more or fewer holes may exist for securing clip to rail member 12. One long oval shaped hole may also exist to secure clip 80 to rail member 12. Clip 80 and cover 82 are further not limited in the number of openings 88 and 90 that connect clip 80 to cover 82. Long oval shaped holes may again be used to secure clip 80 to cover 82. Clip 80 and cover 82 of cap 20 may be any color or made of any material capable of maintaining the shape without deformation to the extent the cap would no longer serve its essential purpose.

Described above is a cap for securing the interlocking members of a bed frame with flush rail support surfaces. One embodiment of the cap includes a main body portion and at least one connection piece such that the cap locks in place securing the caster mount and rail member. Certain embodiments of the cap may also include a member protruding from the main body portion with a slot within the member sized to accept and guide a portion of one of the interlocking members wherein the portion of the rail member is interlocked with another rail member. The cap may further include at least one piece protruding from the main body portion to support the shape and structure of the main body portion. Other embodiments of the cap include a cover piece to cover the volume created by the connection of the rail member and the caster mount. The cover piece may commonly connect with the main body portion of the cap, and may contain protruding members to facilitate that connection or holes wherein a connection means may be inserted into the holes to facilitate the connection between the cover piece and the main body portion of the cap.

Also described above is a method for securing the interlocking members of a bed frame with interlocking members and flush rail support surfaces which includes aligning a cap with the members of a bed frame such that at least one edge of the main body portion of the cap are aligned with at least one corresponding edge of a caster mount of the bed frame; and a portion of a rail member of the bed frame that is interconnected with a slot in the caster mount is aligned with a slot within a vertical member protruding from the main body portion of the cap. Pressure is then applied to the cap towards the members of the bed frame such that the portion of the rail member enters the slot of the vertical member of the cap until the portion of the rail member is at the furthest point possible within the slot and the edges of the cap are aligned with the edges of the caster mount, at which time the pressure is released.

A further method for securing a bed frame with interlocking members and flush rail support surfaces is described, which includes aligning a cap with the members of a bed frame such that at least one surface of the main body portion of the cap is aligned with at least one corresponding surface of a caster mount of the bed frame; interlocking the caster mount with corresponding rail member of the bed frame; aligning the cap such that an at least one opening in the cap is positioned to align with a corresponding at least one opening of at least one of the interlocking members; and connecting the cap to the interlocking members by inserting a connection means into the aligned openings.

In the foregoing description, certain terms have been used for brevity, clearness, illustration and understanding; but no unnecessary limitations are to be implied therefrom beyond the requirements of the prior art, because such terms are used for descriptive purposes and are intended to be broadly construed. Moreover, this invention has been described in detail with reference to specific embodiments thereof, including the respective best modes for carrying out each embodiment. It shall be understood that these illustrations are by way of example and not by way of limitation.

What is claimed is:

1. A cap for securing at least one interlocking rail members of a bed frame with interlocking members and flush rail support surfaces which comprises:
   (a) a main body portion; and
   (b) at least one connection piece protruding from said main body portion positioned to interconnect with a portion of the bed frame;
   wherein said connection piece secures said cap to said at least one interlocking member.

2. The cap of claim 1 which further comprises:
   (a) a cover portion wherein said cover portion is configured to connect with said main body portion.

3. The cap of claim 2 wherein at least one member protrudes from said cover portion for connection with said main body portion.

4. The cap of claim 2 wherein at least one opening exists within said cover portion;
   and further wherein at least one connecting means is inserted through said at least one opening for connection with said main body portion.

5. The cap of claim 1 which further comprises:
   (a) an inner guiding means protruding inwardly from said main body portion of said cap;
   (b) a slot within said guiding means sized to accept a portion of one of said interlocking members wherein said portion of said rail member is interlocked with another rail member;
   wherein an extending portion of a penetrating leg fits into said slot within said guiding means of said cap.

6. The cap of claim 5 which further comprises:
   at least one piece protruding from said main body portion of said cap to support the shape and structure of said main body portion.

7. The bed frame of claim 5 wherein
said main body portion of said cap is curved.

8. The cap of claim 1 which further comprises:
   a horizontal rib protruding inwardly from said main body portion of said cap across at least a portion of the width of said main body portion of said cap wherein said horizontal rib is positioned to be a positive stop for an extending portion of a penetrating leg.

9. The cap of claim 8 which further comprises:
   at least one side member extending from the main body of said cap wherein said at least one side member is positioned to extend over at least a portion of said bed frame said cap is attached thereto.

10. The bed frame of claim 1 wherein
said cap is positioned between said interlocking members and said at least one connection piece includes at least one hole for insertion of a connecting member that secures said cap to at least one of said interlocking members.

* * * * *